United States Patent [19]

Koller

[11] 4,239,353

[45] Dec. 16, 1980

[54] CONTACT LENSES HAVING SPECIALLY PROFILED CROSS SECTIONS

[76] Inventor: Bruno Koller, Hasengasse 23, 6 Frankfurt am Main, Fed. Rep. of Germany

[21] Appl. No.: 954,432

[22] Filed: Oct. 25, 1978

[30] Foreign Application Priority Data

Nov. 2, 1977 [DE] Fed. Rep. of Germany ....... 2749144

[51] Int. Cl.$^3$ .............................................. G02C 7/04
[52] U.S. Cl. .............................................. 351/160 H
[58] Field of Search ........................ 351/160 R, 160 H

[56] References Cited

U.S. PATENT DOCUMENTS 4,084,890  4/1978  Baron ................................... 351/160

FOREIGN PATENT DOCUMENTS 2426701  12/1975  Fed. Rep. of Germany ...... 351/160 H

OTHER PUBLICATIONS

*Encyclopedia of Contact Lens Practice*; Sep. 1, 1960, Chapter XIII, p. 56 (FIG. 50).

*Primary Examiner*—John K. Corbin
*Assistant Examiner*—Scott J. Sugarman
*Attorney, Agent, or Firm*—Edward D. Gilhooly

[57] ABSTRACT

An optical contact lens having a central optical portion and outer peripheral portion terminating in an edge having an acute angle. The thickness of the lens is greatest in the central optical portion and in the peripheral portion possesses the least thickness of the lens along a circumferential line approximately positioned adjacent the limbus of the eyeball to permit the lens to automatically adapt to various shapes of individuals.

1 Claim, 1 Drawing Figure

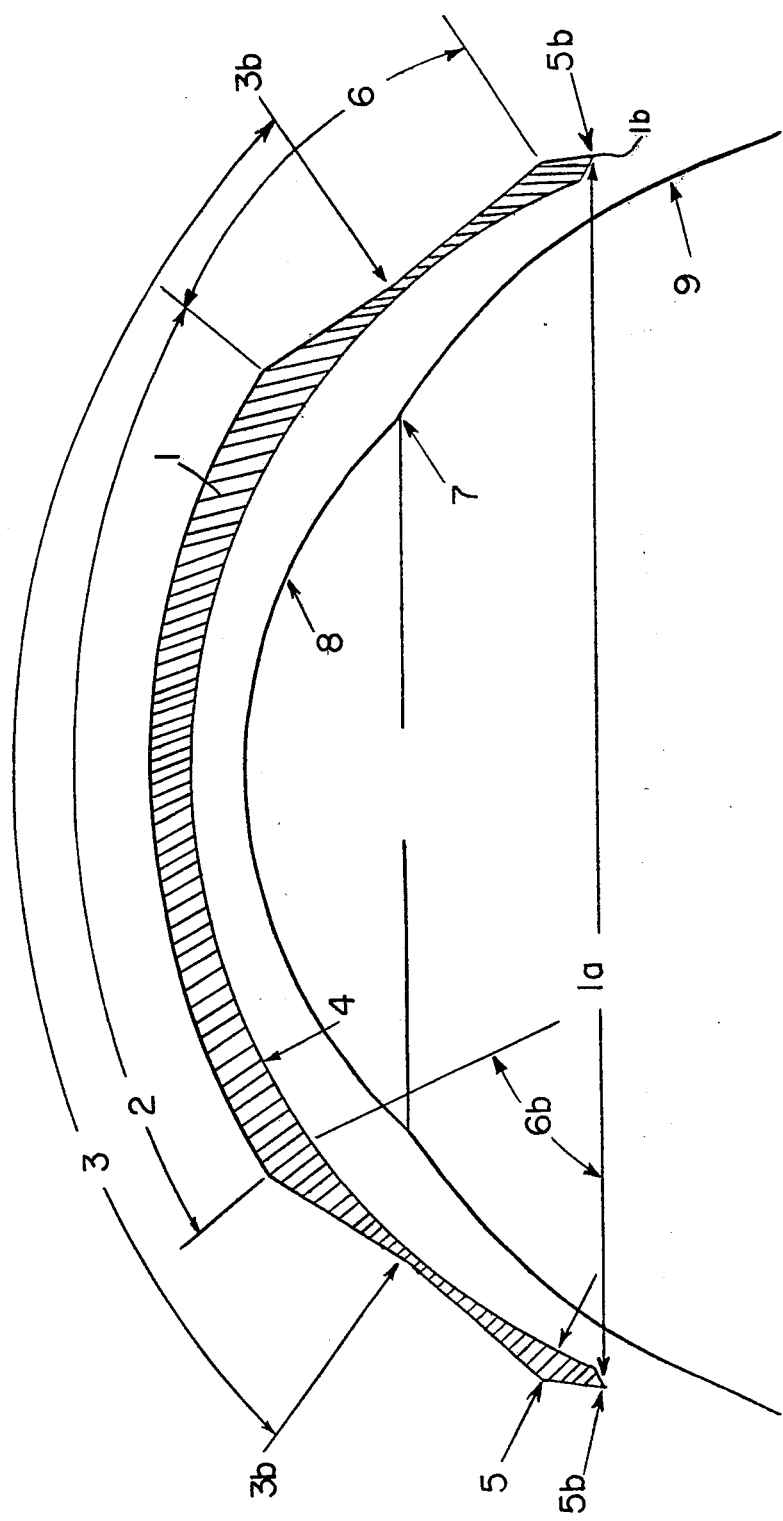

CONTACT LENSES HAVING SPECIALLY PROFILED CROSS SECTIONS

BACKGROUND OF THE INVENTION

The invention is directed to a special cross section of the supporting edge of soft contact lenses or hard soft contact lenses (hard in the center, soft at the edge), as used for correction of visual defects.

With soft or hard soft lenses, it is necessary for the overall diameter of the lenses to be greater than the corneal diameter, that is to say, always greater than 11.0 mm., preferably approximately 15.0 mm., whereby the diameter of the optical zone necessary for correction of the visual defect is only approximately 8.0 mm. The zone between the outer diameter of the optical zone and the outer edge of the lens is termed the supporting edge which configuration must be specially matched to the shape of the eyeball. Particularly in this area, there are innumerable curves on the eyeball which are not measurable or hardly measurable. In addition, these curves are different with every eye; at the same time, the diameter of the cornea is always different as well. The cornea also protrudes from the eyeball by a very pronounced curve. The limbus is located in this area and is the tissue between the cornea and the sclera of the eyeball. If careful accurate matching of the supporting edge of the lens to the eye profile is not achieved, significant problems can frequently be expected. One of these problems is that the soft lens deforms and thus provides reduced visual acuity. Also, it is possible for pressure, abrasion, reddening, inflammation and deficient metabolism to occur as a result of constricted or partially constricted lacrimal film exchange underneath the lens due to inaccurate matching. This means reduced subjective and and objective wearing comfort.

There are various supporting edge cross sections being used in soft contact lenses to attempt to overcome these problems. For example, one such known cross section diminishes in a wedge-shape fashion from the edge of the optical zone to the lens edge or in another design diminishes very sharply from the optical edge and then continues parallel past the whole supporting edge section up to the lens edge. The supporting edge is in the latter case intentionally cut thin, preferably 0.10 mm. and automatically provides individual conforming curves when in contact with the eye.

In the case of the cross section which diminishes in a wedge-shape fashion from the optical edge up to the edge, optimum automatic fitting is only possible at the edge of the lens. At this point, the edge, however, should be somewhat thickened to provide ideal tear resistance. At the limbus on the other hand, or in the central area (diameter range of approximately 11.5 mm.), the lens is at its thickest or almost at its thickest. It is here, however, that the lens should have optimum conformability; that is to say, not intentionally thick, but it should be as thin as possible to obtain maximum automatic conformability to the eye profile. It is only in this manner that the use of the lens and its range of application can be optimized. Such wedge-shape diminution toward the edge of the cross section of the lens is independent of the number of internal curves of the lens.

In connection with the aforementioned sharp diminishment of the cross section of known lenses, the cross section is linked to a single curve form of the inner surface of the lens, the supporting edge of which runs parallel from the edge past the limbus, and then merges as an oblique curve into the thicker central optical area. When in contact with the eye, this supporting edge can automatically conform individually to the curves of the eye through the principle of the kinked curves. The thinner the supporting edge, the greater this characteristic. However, the tear resistance is now reduced in the case of the lens edge which is now thinner. The instability of the lens and difficulty of handling increase at the same time, so that a supporting edge thickness of less than 9/100 mm. is not recommended. This factor is also supported by the difficulty of manufacture. If, on the other hand, the supporting edge exhibits a thickness greater than 12/100 mm. standard, the same problems regarding conformability reoccur as in the case of the cross section of the above mentioned soft lens.

SUMMARY OF THE INVENTION

It is, therefore, an object of this invention to improve contact lenses.

Another object of the invention is to maximize wearing and optical characteristics.

A further object of the invention is to maximize tear resistance of the edge of a contact lens.

These and other objects are attained in accordance with the present invention, wherein there is provided a contact lens which is based on maximizing the tear resistance of the soft lens edge as well as maximizing the subjective and objective wearing comfort and the field of optical application. By maximizing individual conformability of the lenses of the invention to different eye shapes and minimizing the material volume and the supporting edge cross section, increased simplification of fitting is attained. At the same time, this special cross section of the supporting edge should not be linked to a single curve internal surface to permit additional variations. This problem is solved by the invention in that the soft lens is kept extremely thin where automatic individual conformability is necessary; it is thicker where it should be stable and, if necessary, as well where less conformability is desirable.

BRIEF DESCRIPTION OF THE DRAWING

Further objects of the invention, together with additional features contributing thereto and accruing therefrom, will be apparent from the following description of an embodiment of the invention when read in conjunction with the accompanying drawing wherein:

the FIGURE illustrates a contact lens of the invention adjacent a human eyeball.

DESCRIPTION OF A PREFERRED EMBODIMENT

Referring now to the drawing, there is illustrated a soft contact lens of the invention positioned adjacent a depiction of a human eyeball. The lens has a series of zones of which the central zone is the central optical zone to where correction of vision is achieved. In the frontal view (not shown) lens 1 includes a diameter 1a as indicated in the FIGURE and possesses an outer circumferential edge 1b. The edge of the soft contact lens of the invention is intentionally kept thick such as, for example, approximately 15/100 mm. due to increased tear resistance.

To retain full compatability of the edge in spite of its thickness, edge 1c forms an acute angle 5b.

Central optical section 2, being approximately 8 mm. in diameter in one embodiment of the invention, is maintained somewhat thick through the central portion of lens 1, so that the lens is adequately strong and not unstable. In the center of the optical section, the lens may be 15/100 mm. thick in its center portion and up to approximately 30/100 mm. for a very strong negtive lens. From the outer limits of the central optical section 2 to edge 1b, the lens 1 includes a continuous peripheral section having a varying thickness and cross section less than section 2.

The preferred overall diameter of lens 1 is 15 mm. as indicated by extent 1a in the FIGURE. At half the distance between lens edge 1b and the edge of optical zone, edge 3b corresponds to the diameter of approximately preferrably 11.5 mm. (variable between 10 and 30 mm.), whereby the lens 1 has its minimum material thickness of perferrably 4 to 6/100 mm. at 3b. This very pronounced reduction thickness in the center lens area is preferrably continuous. The minimum thickness can be positioned at a circumferential location approximately corresponding or immediately adjacent to the limbus of the eye which is the curved area existing between the cornea 8 and the eyeball 9. At this location optimum conformability is necessary and is provided by the invention in the application.

Immediately adjacent to this minimum thickness of the contact lens generally at 3b, the edge of the lens thereby increases in thickness to nearly 50% causing an increase in tear resistance of the soft contact lens while simultaneously retaining full compatability at the edge as a result of the acute angle shaping. This maximizes the principle of automatically conforming an individual's eyeball in curves to each lens, and the individual cornea diameter as a result of the thickness reduction which is preferrably 4 to 6/100 mm. is in the area designated 3b. This results in a reduction in thickness of the lens at the edge and at the limbus. This provides considerable reduction in the material volume and means that there is minimum possible pressure on the eyeball with at the same time optimum pressure distribution, improved lacrimal exchange underneath the lens material to the material in the case of hydromaterial. In addition, the invention results in improved visual accuity to the accurate deformation, preceeding even when the lens is shifted by eye movements, provides subjective and objective compatability in reduction of the lens bed, easier fitting and the like.

In a preferred embodiment, the internal surface indicated by reference numeral 4 of lens 1 possesses a single curve form. The thickest portion of the peripheral section of the lens 1, as indicated by reference numeral 5, is ground to an acute angle at an outer apex and possesses a thickness of 15/100 mm or other suitable dimension. The outer surface of lens 1, starting at the apex indicated by reference numeral 5 and extending to section 2, forms an interconnecting zone 6 which extends as a pair of intersecting planar surfaces in a direction extending substantially perpendicular to the radius of curvature of the inner surface 4 and meet at point 3b to form the thinnest point on the lens 1. This results in an improved cross-section 6b of the supporting edge having the advantages heretofore described.

In addition, the novel cross section of the invention is advantageous in that the internal shape of the lens is not bound to the single curve form as in curves often found in prior art soft lenses. Single curve form is in fact preferrable, but it can also be combined with two or more internal curves to produce special effects. The reduction at area 3b of the lens to 4 to 6/100 mm. in the preferred embodiment and increases the edge thickness to a factor greater than usual dimension such as to 15/100 mm. are determinative of the functional stability of the lens cross section.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

What is claimed is:

1. An optical contact lens comprising body means forming a circular optical lens having a configuration to approximately conform to the contour of a human eye, said body means having a central optical section approximately conforming to the curve of the cornea of a human eye and a peripheral section to be situated adjacent the scleral curve of a human eye and terminating at a thin peripheral edge of the body means, said body means further including a zone interconnecting said central optical section and said peripheral section, a portion of said zone having a thickness less than the thickness of said central section and said peripheral section, said portion being adapted to be positioned approximately adjacent the limbus of the eye at a position spaced from said optical section, said zone permitting said peripheral section to flex relative to said central optical section and automatically conform to the particular curvature of the sclera of an individual's eye, said peripheral section having a continuous variable thickness respectively increasing from said peripheral edge and said zone creating an external apex spaced from said edge at the maximum thickness thereof and spaced from said portion of said zone, and said body means having a pair of intersecting outer surfaces respectively extending from said central optical section and said apex to create said portion of said zone at the intersection thereof.

* * * * *